Sept. 24, 1935.  R. W. HAYS  2,015,109
TOOL
Filed Nov. 20, 1933
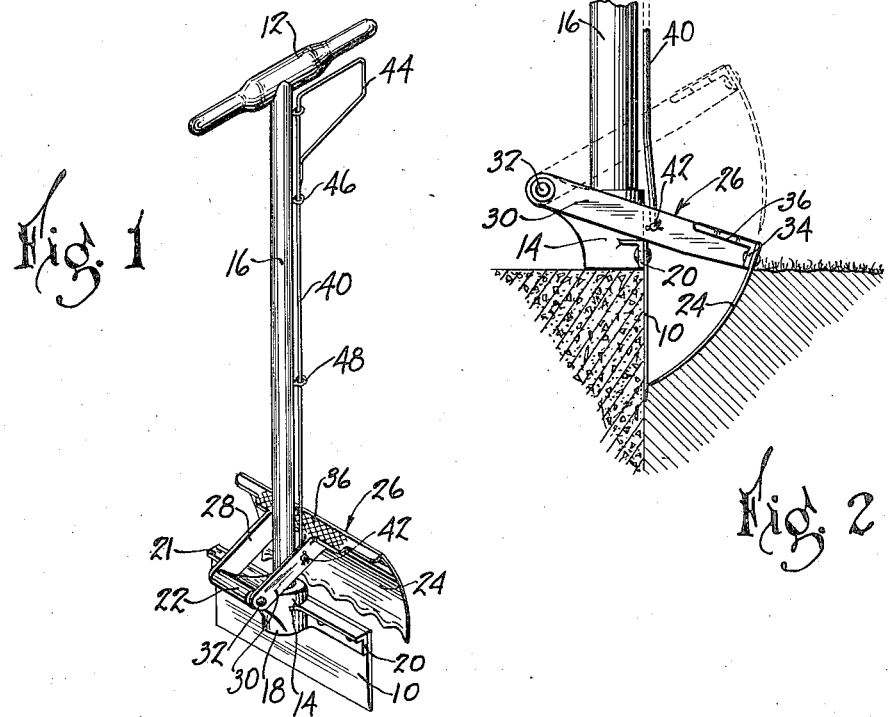
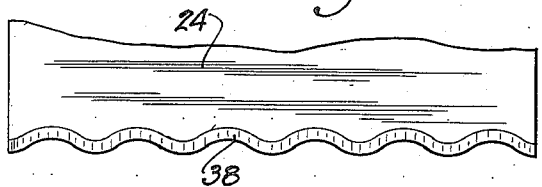
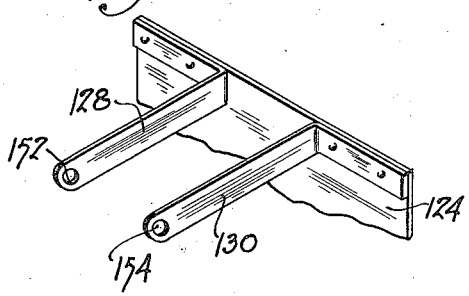
INVENTOR.
Roy W. Hays
BY Jerome R. Cox
ATTORNEY.

Patented Sept. 24, 1935

2,015,109

UNITED STATES PATENT OFFICE 2,015,109

TOOL

Roy Wilson Hays, South Bend, Ind.

Application November 20, 1933, Serial No. 698,847

5 Claims. (Cl. 97—227)

This invention relates in general to tools and particularly to implements for trimming the edges of lawns and other forms of turf.

As is well known, lawns have a tendency to grow in irregular fashion and unless carefully attended the edges thereof are prone to present an untidy appearance. It is customary therefore to trim the edges of lawns in a more or less regular line, forming a small ditch or groove adjacent thereto. This practice adds greatly to the appearance of the lawn and especially is this true adjacent to walks and adjacent to flower beds.

Prior to my invention, gardeners have used a variety of different kinds of tools for accomplishing the above mentioned purpose. For instance hose and spades have sometimes been used. Sometimes special tools have been designed. All of the prior art devices, of which I am aware, however, are subject to one or more of the following disadvantages. Many of these devices require extraordinary care to insure a straight line and to insure a ditch of uniform depth and width. Oftentimes the ditch formed is too deep. Always both sides of the ditch are flat instead of curved thus detracting from the beauty of the result. Always it is difficult to remove the loose turf and grass and this scattered turf and grass presents an untidy appearance.

One of the objects of this invention therefore is to provide an implement of the character described adapted to accomplish the above mentioned purposes without the above described disadvantages.

A further object is to provide a lawn trimming implement of the character described which will "edge" out a perfectly straight line of the right width giving a uniform finish.

A further object is to provide such a tool which is easy of operation, substantially effortless and quick in action.

A further object is to provide such a tool which will obviate the necessity of cleaning up and which is capable in itself of lifting the cuttings so that they may be deposited in a pail or basket as one goes along.

Features of the invention include a fixed flat blade secured to a rod and connected to a handle whereby backbending is eliminated; a curved blade hinged relative to the flat blade so that the center of curvature is at the center of the hinge and movable from a position in which the edges are separated to a position in which the edges are adjacent to each other whereby the turf may be cut and thereafter lifted; and a wire tension element by which the curved blade may be raised to release the cuttings.

Further objects and features of the invention will be apparent from the subjoined specification and claims when taken in connection with the accompanying drawing in which:

Figure 1 is a view in perspective of an embodiment of my invention showing the curved blade in raised position;

Figure 2 is a fragmentary view in side elevation showing the curved blade in its lowered position but showing the turf and cement walk in position;

Figure 3 is a fragmentary view of the curved blade in front elevation; and

Figure 4 is a fragmentary view illustrating a modification.

The implement disclosed in Figures 1-3 inclusive will now be described in detail. The fixed blade 10 which cuts the edge of the small ditch dug by the implement serves to position the implement during operation and is connected to a handle 12 by which the implement may be carried and handled. The blade 10 is secured to a bracket 14 in turn secured to the lower end of a rod 16. The upper end of the rod 16 is secured to the handle 12. The blade 10 is adapted to be first inserted in the earth and this positions the movable blade. It may thus be termed a guide element therefor.

The bracket 14 performs several functions. It is formed with a tubular socket in which the rod 16 is secured. It is provided with a flange 20 to which the blade 10 is riveted. It has a tread portion 21 which is used in pressing the blade into the earth by the foot. It also has a boss formed with a sleeve 22 in which the curved blade hinges. It thus forms a support for the fixed blade and also for the curved movable blade. The bottom of the bracket 14 limits the downward movement of the tool and thus controls the depth of the trench to insure that it is uniform.

The curved blade 24 is hinged in the sleeve 22 by means of a bracket generally designated 26. The bracket 26 is provided with a pair of arms or ears, 28 and 30, formed with aligned holes through which a bolt 32 passes. The bolt 32 also passes through the sleeve 22 and thus secures the bracket 26 to the bracket 14 so that the bracket 26 hinges on the bracket 14. The bracket 26 is also formed with a flange 34 to which the curved blade 24 is riveted. It also has a tread portion 36 which is used when the curved blade 24 is being forced into the earth.

The blade 24 is specially adapted for use in my improved implement. It is formed with a radius of curvature equal to the distance between the blade and the hinge formed by the bolt 22. That is to say its curve is formed about the hinge as a center. Thus its movement through the earth is facilitated. The distance between the cutting edge of the blade 10 and the hinge bolt 22 is also substantially equal to but slightly longer than the radius of curvature of the blade 26. Thus at the completion of its down stroke the edge of the blade 24 substantially contacts with the surface of the blade 10 adjacent to its edge and by gravity the blades are maintained together to hold the wedge of turf cut out securely in the pocket formed thereby and to prevent the cuttings from spilling. One or both of the blades may be serrated. As shown the blade 24 is serrated as at 38, thus facilitating the cutting operation. The fact that the edge of the blade 10 extends slightly below the blade 24 allows the blades to be sharpened without destroying the utility of the tool.

The blade may be raised by a wire 40 so that when desired the cuttings may be released into a pail, basket or other container. The wire 40 is bent at its lower end and said bent end extends through a hole in one of the arms of the movable bracket. As shown the end extends as at 42 through a hole in the arm 30. Thus the wire forms a tension element pivotally connected to the curved blade 24. The upper end of the wire 40 is formed with a loop 44 by means of which it may be grasped to raise the blade. One or more screws such as 46 and 48 may be provided to guide the wire 40 or any other suitable positioning means may be used.

In the modification shown in Figure 4 the bracket 26 is replaced by a pair of right angle strips 128 and 130 which are riveted to the curved blade 124. The strips 128 and 130 are formed with aligned holes 152 and 154 respectively by means of which the strips and blade may be hinged upon a bracket similar to the bracket 14.

The operating of this device is easily understood. The device is carried and positioned by the operator through the handle 12. If some pre-existing line is being followed, such as walk (cement or otherwise), a flower bed, a tree, or shrubbery, the blade is positioned on the line. Then stepping on the tread 21, the blade 10 is forced into the turf. In this operation one corner may be first forced in and thereafter the opposite end until the lower end of the socket 18 contacts the turf with the blade extending uniformly into the earth. Then the operator steps on the tread 36 and because of the serrated edge and the curvature of the blade easily forces the blade through the turf. This completes the cutting of a wedge of turf of uniform width and depth and having one side formed of a pleasing curved contour.

The operator then lifts the tool together with the wedge of turf by means of the handle 12. Gravity maintains the blades together and the wedge of turf in the pocket formed thereby. The operator places the tool over a pail, basket or other container and pulls on the loop 44 thus lifting the blade 24 and releasing the turf into the pail, basket or other container. The tool is then ready for another operation.

It may thus be seen that I have provided a tool which fills a definite need. It is useful for keeping borders of lawns, flower-beds, odd shaped spots, trees, and shrubbery neat and trim. It edges out a straight line of right depth and width and of pleasing contour and gives a uniform finish. It can be used around circular shaped plots with ease and speed.

The tool can be used by anyone. It is very easy of operation, and quick in action. There is no after cleaning up inasmuch as all cuttings can be deposited in a container. It is unnecessary to bend over during any part of the operation.

The provision of two blades, one movable, relative to the other, but both adapted to follow exactly the cutting path insures the cutting of the wedge of turf with minimum of effort. The curving of the hinged movable blade in an arc about the hinge as a center enables the hinged blade to follow the cutting path exactly. The arrangement of the movable blade so that its edge moves substantially into contact with the surface of the fixed blade enables the wedge of turf to be lifted without spilling.

It is to be understood that the above embodiments of my invention are for the purpose of illustration only and various changes may be made therein without departing from the spirit and scope of the invention.

I claim:

1. An implement of the character described comprising a relatively fixed blade, a relatively movable blade movable from a position in which the blades are separated to a position in which the edges of the blades are adjacent to each other and in which the blades form a pocket between them, a rod to which said blades are secured, a handle for said rod, and means for holding said movable blade selectively in either its separated or its adjacent position, said means comprising a wire connected to said movable blade and extending to a point adjacent to said handle.

2. An implement of the character described comprising a relatively flat blade, a curved blade movable from a position in which the blades are separated to a position in which the edges of the blades are adjacent to each other and in which the blades form a pocket between them, a support to which said flat blade is secured, a bracket hinged on said support and to which said curved blade is secured, a rod secured to said support, a handle secured to said rod, and a wire having one end connected to said bracket and the opposite end positioned adjacent to said handle whereby the operator may hold the blades in position to lift a strip of turf cut by the implement and may release the strip at will.

3. An implement of the character described comprising a flat relatively fixed blade; a bracket secured thereto formed with a tread portion, with a tubular socket, and with a boss formed with a sleeve positioned perpendicular to said socket; a rod having one end secured in said socket and extending in substantial alignment with the direction of movement of said blade in operation; a handle secured to the opposite end of said rod and positioned perpendicular to said rod and to the plane of said blade; a bracket formed with a pair of arms, a tread portion, and a flange; a bolt by which said last mentioned bracket is hinged in said sleeve; a curved serrated blade secured to said flange and formed with its center of curvature at said hinge and arranged to hinge about said sleeve from a position in which all portions thereof are separated from said fixed blade to a position in which its edge is adjacent to the edge of said fixed blade; and a wire connected at one end to one of said arms and having its opposite end formed as a loop positioned adjacent to said handle.

4. An implement of the character described comprising a fixed blade, a support therefor, a pair of right angle braces pivoted on said support and a blade secured to said braces for cooperative swinging movement relative to said fixed blade.

5. An implement of the character described comprising a flat relatively fixed blade, a rod connected to said blade, a handle secured to the opposite end of said rod, a curved blade rotatable about a hinge connected with said fixed blade movable from a position in which the blades are separated to a position in which the blades are adjacent to each other and in which the blades form a pocket between them, and a wire connected at one end to said curved blade and having its opposite end formed as a loop positioned adjacent to said handle whereby the operator may hold the blades in position to lift a strip of turf cut by the implement and may release the strip at will.

ROY W. HAYS.